United States Patent Office 3,030,801
Patented Apr. 24, 1962

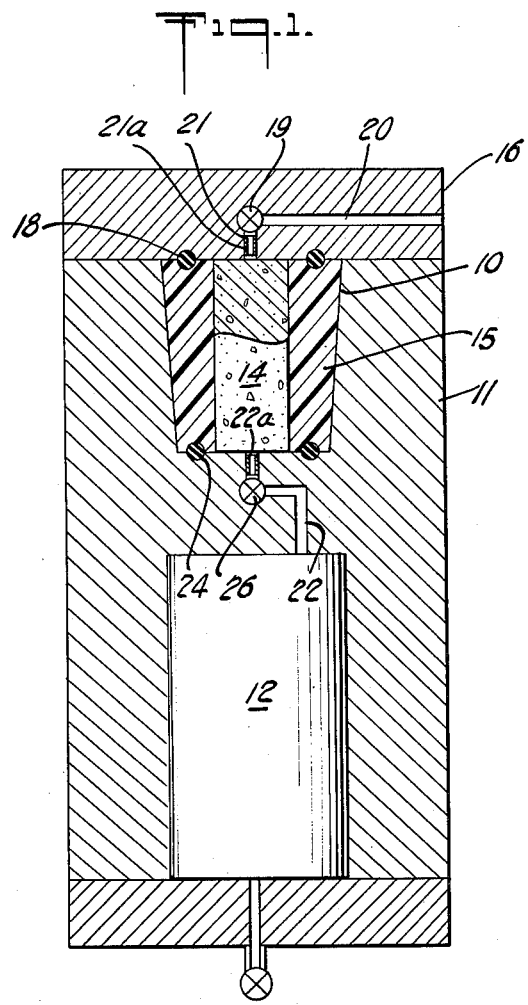

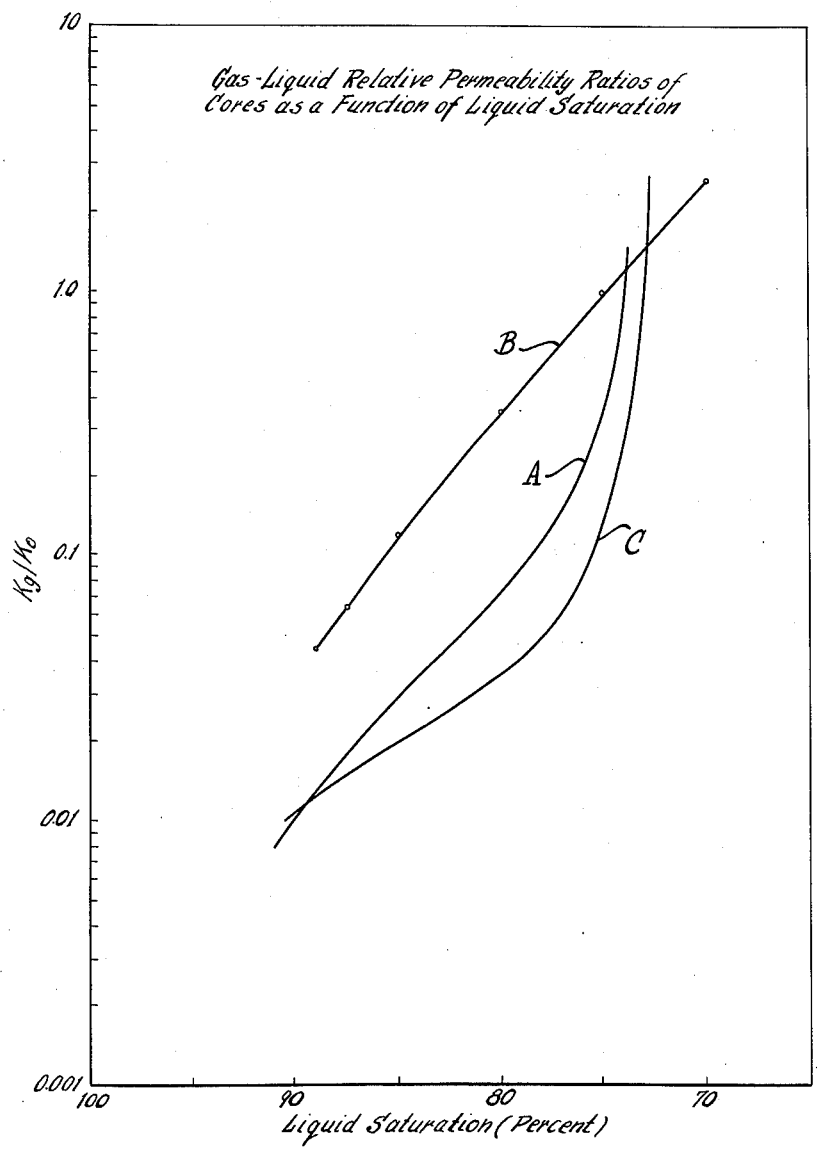

3,030,801
METHOD FOR PERMEABILITY MEASUREMENTS
Joseph C. Allen, Bellaire, Tex., assignor to Texaco Inc., a corporation of Delaware
Filed June 3, 1957, Ser. No. 663,272
8 Claims. (Cl. 73—38)

This invention relates to a method for determining the permeability of porous solid materials. More particularly, this invention relates to a method for determining the relative permeability of fluids through porous solid materials.

One embodiment of the practice of this invention is particularly applicable for the determination of relative gas-oil permeabilities of porous solid materials, such as cores recovered from or representative of underground petroleum producing formations. Another embodiment of the practice of this invention is particularly applicable to the determination of relative gas-oil permeabilities of porous solid materials and the calculation and/or determination of the productivity of subsurface petroleum producing formations.

In the production of oil from subsurface formations in most instances primary depletion is by solution gas drive. In a solution gas drive the gas dissolved in the oil expands as pressure on the oil is reduced and the gas released from solution. This expansion and release of the gas causes the oil to flow toward the zone of reduced pressure and/or to the surface. The porous, underground matrices in which the oil occurs vary widely in composition, configuration and various other properties. One characteristic or property of the porous matrix or porous formation containing the oil which has an important effect upon the recovery of oil therefrom by primary drive is the fluid permeabilities, particularly the gas-oil relative permeability, of the underground formation. Gas-liquid (oil) permeability is the relative rate at which gas and liquid (oil) flow through and from the formation as a function of the saturation of the gas and liquid (oil) therein. When more than one fluid phase is present in a porous medium, the term "permeability" should be specifically associated with the individual phase involved. The porous formation or material itself will still have a permeability referring to its flow capacity for a single-phase, or homogeneous fluid. This flow capacity or permeability will be independent of the nature of the fluid, as long as the latter does not interact with the porous material. However, in referring to the composite system of the solid porous material and the fluids contained therein and flowing therethrough, the flow capacity should be expressed in terms of permeabilities to the separate fluid phases present. Their absolute magnitudes may be termed "effective" permeabilities. Or, more conveniently, they may be expressed as fractions of the homogeneous fluid permeabilities, i.e., as "relative permeabilities." For example, if an oil-containing porous solid or core of 500 millidar-cys (md.) homogeneous fluid permeability and containing 20% connate water produced water-free oil at a rate corresponding to a permeability of 400-md., the core may be described by saying that its relative permeability to the water is zero and that its relative permeability to oil is 80%, or that the effective permeability of the core to the water is zero and to the oil is 400-md. Likewise, if the 500-md. core is producing both free gas and oil and if the permeabilities as calculated for each phase separately, as if each alone were flowing through the rock, are 200-md. for the gas and 150-md. for the oil, the results may be expressed as 40% relative permeability for the gas and 10% relative permeability for the oil. The subject of permeability and relative or effective permeability is adequately and fully discussed by Morris Muskat in "Physical Principles of Oil Production," published 1949 by McGraw-Hill Book Co., Inc., at pages 271-274. The above-referred pages of this publication are herein incorporated and made part of this disclosure.

An accurate knowledge of the permeability, particularly the gas-oil relative permeability characteristics of a formation is desirable in order to arrive at a reasonably accurate estimate of the productivity or productive behavior of an oil field as pressure therein declines. One method of obtaining a gas-oil relative permeability is by steady state measurements. In steady state measurements varying equilibrium gas saturations are employed and then the gas permeability is measured at a differential pressure sufficiently low so that the oil in the core sample undergoing test is relatively immobile. The measurement of gas-oil relative permeability by methods employing the above-indicated steady state conditions is laborious, tedious and time consuming.

Another, but simplified, technique for obtaining approximate gas-oil relative permeabilities consists in saturating small cores with oil and then displacing the oil therefrom by an external gas drive. The relative permeability is then computed from the known steady state data making certain simplified assumptions. It is questionable, however, that the data with respect to gas-oil relative permeabilities obtained by this type operation are valid, particularly when solution gas drive is the principal producing mechanism in the producing formation study, i.e., from which the core sample tested was obtained. Another method of obtaining relative or effective permeabilities is disclosed by K. C. ten Brink—U.S. 2,724,963 which issued November 29, 1955.

It is an object of this invention to provide an improved method for obtaining relative gas-oil permeabilities of porous solid materials.

Still another object of this invention is to provide a method whereby accurate gas-oil relative permeabilities of porous solid materials can be obtained so that more accurate reservoir productivity calculations can be made.

Still another object of this invention is to provide a simplified direct method for obtaining accurate gas-oil relative permeabilities.

How these and other objects of this invention are achieved will become apparent with reference to the accompanying disclosure and drawing wherein FIG. 1 schematically illustrates a permeameter in accordance with this invention, and wherein FIG. 2 graphically illustrates relative gas-oil permeability data obtained in the practice of this invention.

In accordance with the practice of this invention relative fluid (gas and liquid) permeabilities, such as gas-liquid (oil) permeabilities of porous solid materials are determined by solution gas drive. More particularly, in accordance with the practice of this invention gas-oil permeabilities of porous solid materials are obtained by a method employing so-called solution gas drive wherein a porous solid material saturated to a known extent with a liquid containing gas dissolved therein is incrementally produced, i.e., the gas-saturated liquid in part withdrawn therefrom such as by pressure depletion, and the amount and composition and rate of production of the resulting produced fluids then determined, thereby indicating the relative gas-oil permeabilities of the porous solid materials under the conditions of the test.

More particularly, in accordance with the practice of this invention for the determination of relative gas-oil permeabilities a core or sample of porous solid material is saturated with "live" oil, i.e., oil containing dissolved therein at an elevated pressure a substantial amount of a gas, such as natural gas, nitrogen, etc. For purposes of simplicity the gas-oil composition or live oil could be a simple binary mixture of a gas, such as nitrogen, and a liquid, such as n-heptane. The pressure-volume relationship of such a gas-oil composition at a given temperature can readily be accurately determined. For example, the specific property, such as bubble point pressure, as a function of composition of the gas-oil mixture or the gas-oil ratio at a given temperature could readily be determined.

In determining relative gas-oil permeabilities in accordance with this invention by employing live oil a high pressure permeameter and a pressure-volume-temperature (P-V-T) cell are built as a substantially single unit with a flow control means, such as a valve interconnecting the permeameter and the P-V-T cell. The core of porous material to be tested is placed and sealed in the permeameter and the P-V-T cell is then filled with mercury at substantially the same pressure as that exerted upon the live oil in the saturated core sample. The valve is then opened for a measured period of time and an increment of gas-oil fluid withdrawn from the core. The valve is then closed and the volume and composition of the withdrawn fluid determined. For example, the bubble point pressure of the withdrawn fluid could be measured and its composition thereby determined. Also, the pressure in the core would define the relative gas-oil saturations within the core sample. The above procedure is then repeated by either accumulating the withdrawn fluid or by discharging each incremental amount of withdrawn fluid from the P-V-T cell.

Referring now to FIG. 1 of the drawing a high pressure permeameter is shown schematically illustrated therein. The high pressure permeameter comprises a core chamber 10 provided within container 11 which also provides for a P-V-T cell 12 of about 128 cc. capacity. The core 14 undergoing test is potted and its sides sealed within core chamber 10 by means of a sealing agent such as Lucite 15. One face of the core sample is sealed off by end closure 16 which is provided with gaskets or O-rings 18 between closure 16 and the potting material 15. Associated with closure 16 is needle valve 19 and conduits 20 and 21 for the introduction of the test live oil into the core sample 14 within high pressure permeameter. Container 11 is provided with a conduit 22 interconnecting the other face of the core sample and the P-V-T cell 12. O-ring 24 provides a seal between the potting agent and the core container, thereby sealing off the other face of the core sample. Needle valve 26 serves to control the fluid communication via conduit 22 between core sample 14 and P-V-T cell 12. Metal plugs 21a and 22a are associated with conduits 21 and 22, respectively, to minimize void space within the conduits between both faces of the core and the adjacent needle valves 19 and 26, respectively. This actually constructed core chamber 10 was sufficiently large to contain a core ⅞″ in diameter and 2″ long.

Nitrogen and normal heptane were selected as suitable fluids and were combined into a live oil mixture for the determination of gas-oil permeabilities of a core by the solution gas drive method of this invention. The volumetric and phase behavior on various mixtures of nitrogen and normal heptane were extensively studied at 100° F. and a mixture having a gas (nitrogen)-oil(n-heptane) ratio of 42 cu. ft. per barrel and a bubble point pressure of 511 p.s.i.a. at 100° F. was selected. The extensive study of the nitrogen-n-heptane system at 100° F. provided data for correlation of composition with the pressure-volume properties of the fluids produced or withdrawn from the core during the test.

In obtaining gas-oil relative permeabilities of core samples, a core of solid porous material after having been cleaned and dried was placed and sealed in the permeameter and the permeameter placed in a constant temperature environment or oven with provision for rocking the permeameter during the test, if desired. The selected live oil (oil containing gas dissolved therein) such as nitrogen and n-heptane was charged into the core chamber through the needle valve 19 while maintaining the pressure at each end of the core well above the bubble point pressure of the live oil mixture. The live oil mixture was permitted to remain in the core chamber for several hours to permit any free gas to redissolve. Afterwards, approximately 15 pore volumes of the original live oil mixture were purged through the core sample. The needle valves at both ends of the core chamber were then closed, leaving a pressure of 615 p.s.i.a. in the core. The P-V-T cell was then emptied and thoroughly cleansed, evacuated and filled with mercury at 615 p.s.i.a. The connecting valve between the P-V-T cell and the core holder was then opened and the pressure in the overall system was reduced below the bubble point pressure of the live oil mixture by withdrawing mercury from the P-V-T cell. During this operation the permeameter was in a substantially horizontal position and an incremental amount of the live oil mixture from the core sample was produced under, in effect, a solution gas drive into the P-V-T cell until the pressure stabilized. The pressure volume relationships of the small amounts of fluid thus produced and withdrawn from the core sample into the P-V-T cell were then measured in the usual manner within the P-V-T cell. Data thus obtained upon comparison with previously determined volumetric and phase behavior of the nitrogen-n-heptane system at 100° F. were examined and compared and correleated to determine the quantities of oil and gas produced and present in the withdraw fluid and to determine the fluid saturations in the core at the stabilized pressure. The above operations were repeated in successive pressure decrements and pressure volume measurements made on the cumulative production at each stabilized withdrawal pressure down to a pressure of 38 p.s.i.a. It was observed that the accuracy of the pressure volume measurements improved as the cumulative production increased. The data obtained and employed in the above test are set forth in Table 1.

TABLE I

*Fluid Data*

Gas-oil ratio of original live oil mixture _____ 42 cu. ft. per bbl.
Bubble point pressure at 100° F. ____ 511 p.s.i.a.
Formation volume at 511 p.s.i.a. ____ 1.0436.
Formation volume at 615 p.s.i.a. ____ 1.0428.
Live oil in place at 615 p.s.i.a. and 100° F. _____ 2.651 cc.
Normal heptane originally in place at standard conditions _____ 2.542 cc.

*Core Data*

Air permeability _____ 13.5 md.
Porosity _____ 14.2%.
Nominal pore volume at 75° F. and 1 atmosphere _____ 2.47 cc.

*Permeameter Data*

Nominal volume of P-V-T cell _____ 128 cc.
Volume of core chamber at 100° F. with core in place _____ 2.651 cc.
Approximate volume of "dead" space in core chamber _____ 0.05 cc.

The gas-oil relative permeability ratio, $K_g/K_o$, is related to the producing gas-oil ratio and the expression set forth as Equation 165 on page 242 of "Fundamentals of Reservoir Engineering" by John C. Calhoon, Jr., University of Oklahoma Press, (1953), has been referred to as the instantaneous producing gas-oil ratio equation and is required in calculating the recoveries from solution gas drive. This equation reads:

$$R = \frac{k_g}{k_o} \frac{\mu_o}{\mu_g} \frac{\beta}{v} + r$$

where

R = current producing gas-oil ratio standard cubic feet per barrel of stock tank oil.
$\mu_o$ = reservoir oil viscosity at the current pressure in centipoises.
$\mu_g$ = reservoir gas viscosity at the current pressure in centipoises.
$\beta$ = formation volume factor at the current pressure.
$v$ = factor to convert standard cubic feet of gas to barrels of reservoir gas at the current pressure.
$r$ = gas in solution at the current pressure expressed as standard cubic feet per stock-tank barrel.
$k_g/k_o$ = relative permeability ratio of gas to oil at the current reservoir oil saturation, $S_o$.

By transposition of the members of this equation, the gas-oil relative permeability ratio is $$\frac{K_g}{K_o} = \frac{R-r}{\frac{\mu_o}{\mu_g} \frac{\beta}{v}}$$

The values of the various members of the equation are obtained from tables and charts for P-V-T conditions, such as the matter presented in Table I of the specification. In particular, the gas-oil ratio of the original live oil mixture (R) is measured and the other terms of the equation, except for the $K_g/K_o$ expression, are known from the P-V-T properties of the liquid being used.

Referring now to FIG. 2 there are graphically illustrated therein gas-liquid relative permeability data corresponding to the values of the average incremental pressures. FIG. 2 compares gas-oil relative permeability ratios $K_g/K_o$ data for cores as determined by the practice of this invention and by another method. Results of experiments carried out in accordance with the practice of this invention, i.e., gas-oil permeabilities as determined by solution gas drive methods described herein, are represented by curve A, while the results of depleting the same core by a conventional external gas drive method for the determination of relative gas-oil permeabilities are depicted by curve B. It was observed that ultimate recovery of oil by conventional external gas drive was 9% as compared with a recovered 28% at a final depletion pressure of 38 p.s.i.a in accordance with the method of this invention. These data demonstrate that the flow mechanisms for the two methods of depletion are decidedly different.

Curve C shows $K_g/K_o$ relationships as determined by the solution gas depletion method of this invention on a relatively large core having a pore volume of 250 cc., which is approximately 100 times the pore volume of the test core described hereinabove. This core is typical of the size necessary when the effluent from solution gas expansion is measured by conventional means.

In the determination of relative gas-oil permeabilities in accordance with the practice of this invention any suitable gas-liquid mixture may be employed provided necessary information or data is on hand with respect to the determination of the composition of the withdrawn fluid. Desirably P-V-T data of the gas-oil mixture at a given temperature should be complete so that when the permeameter, which includes in combination the core holder and a P-V-T cell, is operated in accordance with the teachings of this invention the composition of the withdrawn fluid can be readily determined directly from the P-V-T cell on the basis of pressure-volume data observed.

Various gases which may be employed in the determination of the gas-oil permeabilities include nitrogen, air, carbon dioxide, methane, ethane, natural gas and the like. Various fluids which may be employed in the determination of the relative gas-oil permeabilities include the hydrocarbon liquids such as kerosene, various petroleum fractions, substantially pure hydrocarbons such as benzene, n-heptane, n-butane, isobutane, n-pentane, n-octane and the various isomers and homologs thereof.

As will be apparent to those skilled in the art many substitutions, changes and modifications may be made in the practice of this invention without departing from the spirit or scope thereof.

I claim:

1. A method of determining the permeability of a porous solid material with respect to a gas and a liquid flowing simultaneously through said solid material which comprises introducing into said porous solid material at an elevated pressure an amount of a fluid of known composition and comprising a liquid and a gas dissolved therein, said fluid being introduced into said solid material in an amount to saturate substantially completely the pores of said solid material, withdrawing by pressure reduction a measured incremental amount of said previously introduced fluid from said solid material, said withdrawn fluid comprising said gas and said liquid, and determining the composition of the resulting withdrawn fluid with respect to the amount of said gas and said liquid therein thereby indicating the relative permeability of said porous solid material with respect to the liquid and gas components in said withdrawn fluid.

2. A method of determining the relative permeability of a porous solid material with respect to a gas and a liquid flowing simultaneously through said solid material which comprises introducing into said porous solid material at an elevated pressure an amount of a fluid of known composition and comprising a liquid and a gas dissolved therein, said fluid being introduced into said solid material in an amount sufficient to saturate the pores of said solid material and said elevated pressure being at least equal to the bubble point pressure of said fluid, withdrawing by pressure reduction a measured incremental amount of said previously introduced fluid comprising said gas and said liquid from said solid material and determining the composition of the resulting withdrawn fluid with respect to the amount of said gas and said liquid therein thereby indicating the relative permeability of the porous solid material with respect to the gas and liquid components in said withdrawn fluid.

3. A method of determining the relative permeability of a porous solid material with respect to a gas and a hydrocarbon liquid flowing simultaneously through said solid material which comprises introducing into said solid material at an elevated pressure an amount of a fluid of known composition and comprising a hydrocarbon liquid and a gas dissolved therein, said fluid being introduced into said solid material in an amount to saturate substantially completely the available pore space of said solid material and said elevated pressure being at least equal to the bubble point pressure of said fluid, withdrawing by pressure reduction a measured incremental amount of said previously introduced fluid comprising said gas and said liquid from said solid material and determining the composition of the resulting withdrawn fluid with respect to the amount of said gas and said liquid therein thereby indicating the amounts of gas and hydrocarbon liquid withdrawn from said solid material and the relative permeability of said porous solid material with respect to the gas and liquid components in said withdrawn fluid.

4. A method in accordance with claim 3 wherein said gas is nitrogen.

5. A method in accordance with claim 3 wherein said hydrocarbon liquid is n-heptane.

6. A method in accordance with claim 3 wherein said gas is nitrogen and wherein said hydrocarbon liquid is n-heptane.

7. A method in accordance with claim 3 wherein the withdrawal of said previously injected fluid from said porous material is carried out under isothermal conditions.

8. A method in accordance with claim 3 wherein the composition of the resulting withdrawn fluid is determined from P-V-T data.

References Cited in the file of this patent

UNITED STATES PATENTS

| | | |
|---|---|---|
| 2,498,198 | Beeson | Feb. 21, 1950 |
| 2,693,104 | Welge et al. | Nov. 2, 1954 |
| 2,724,963 | Ten Brink | Nov. 29, 1955 |
| 2,737,804 | Herzog et al. | Mar. 13, 1956 |
| 2,874,565 | Kelton | Feb. 24, 1959 |